UNITED STATES PATENT OFFICE 2,416,250

DIHYDRONORDICYCLOPENTADIENYL-SUBSTITUTED FORMALS

Herman A. Bruson, Philadelphia, Pa., assignor to The Resinous Products & Chemical Company, Philadelphia, Pa., a corporation of Delaware No Drawing. Application March 9, 1944, Serial No. 525,757

1 Claim. (Cl. 260—611)

This invention relates to formals of alcohols containing a dihydronordicyclopentadienyl group and to a method for the preparation of these formals from formaldehyde and said alcohols in the presence of an acidic condensing agent.

The formals of this invention are of the general formula

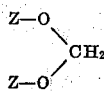

wherein Z is a monovalent organic residue which contains a dihydronordicyclopentadienyl group, —$C_{10}H_{13}$, and which is joined to the indicated methylene group through ether oxygen.

The structure of the dihydronordicyclopetadienyl group may be represented by the following formulae, the first being the more probable,

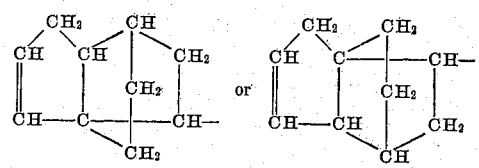

The dihydronordicyclopentadienyl group, $C_{10}H_{13}$— is represented by the structure

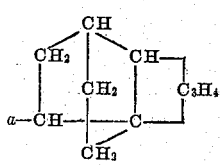

wherein $C_3H_4$ is a propenylene group which in conjunction with the adjoining carbon atoms forms a cyclopenteno ring. The dihydronordicyclopentadienyl group is obtained in acid-catalyzed, addition-rearrangement reactions from dicyclopentadiene. It is monovalent and is attached to its added substituent group, $a$, at a secondary carbon atom flanked by a methylene group and a tertiary carbon atom in an endo-ethylene cyclopentano group carrying the propenylene group which forms a cyclopenteno group therewith.

The formals of greatest interest have the general formula

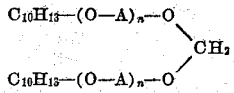

wherein $C_{10}H_{13}$— is the dihydronordicyclopentadienyl group, A is an alkylene group of at least two carbon atoms, and $n$ is zero or an integer. A may also represent an alkylene group having a halogen or an ether group as a substituent.

The formals of this invention are obtained by condensing formaldehyde in the presence of an acidic condensing agent with an alcohol containing the dihydronordicyclopentadienyl system.

Such alcohols are new compounds resulting from the addition rearrangement reaction of dicyclopentadiene with water or polyhydric alcohols in the presence of sulfuric acid or other acidic condensing agents, as described in my copending patent applications Serial Nos. 476,640 and 476,645, filed February 20, 1943, and now issued as United States Patents Nos. 2,394,582 and 2,385,788, respectively. As polyhydric alcohols there may be used ethylene glycol, propylene glycol, trimethylene glycol, the various butylene glycols, and glycols having larger alkylene groups, polyalkylene glycols such as diethylene glycol, triethylene glycol, tetraethylene glycol, dipropylene glycol, dibutylene glycol, and the like, or ethers of polyhydric alcohols with two free hydroxyl groups per molecule, or the polyhydric alcohols themselves with more than two hydroxyl groups.

Typical dihydronordicyclopentadienyl-containing alcohols which are useful for the preparation of formals of this invention are, by way of example, the following:

| | Formula | From dicyclopentadiene and— |
|---|---|---|
| 1 | $C_{10}H_{13}$—OH | Water. |
| 2 | $C_{10}H_{13}$—O—$CH_2CH_2OH$ | Ethylene glycol. |
| 3 | $C_{10}H_{13}$—O—$CH_2CH_2$—O—$CH_2CH_2OH$ | Diethylene glycol. |
| 4 | $C_{10}H_{13}$—O—$CH_2CH_2$—O—$CH_2CH_2$—O—$CH_2CH_2OH$ | Triethylene glycol. |
| 5 | $C_{10}H_{13}(OCH_2CH_2)_nOH$, where $n$ is a whole number, particularly two to nine. | Corresponding polyethylene glycols. |
| 6 | $C_{10}H_{13}$—O—$CH_2CH_2CH_2OH$ | Trimethylene glycol. |
| 7 | $C_{10}H_{13}$—O—$CH_2CH(CH_3)OH$ | Propylene glycol. |
| 8 | $C_{10}H_{13}$—O—$CH(CH_3)(CH_2)CH$—OH | 2,3-butylene glycol |
| 9 | $C_{10}H_{13}$—O—$CH_2CH(CH_3)$—O—$(CH_3)CH$—$CH_2OH$ | Dipropylene glycol. |
| 10 | $C_{10}H_{13}$—O—$CH_2$—CHOH—$CH_2$—$OCH_3$ | Glyceryl-monomethyl ether. |
| 11 | $C_{10}H_{13}$—O—$CH_2$—CHOH—$CH_2Cl$ | Glyceryl monochlorohydrin. |
| 12 | $C_{10}H_{13}$—O—$CH_2$—CHOH—$CH_2$—$OC_6H_5$ | Glyceryl monophenyl ether. |
| 13 | $C_{10}H_{13}$—O—$CH_2$—CHOH—$CH_2$—O—$C_{10}H_{13}$ | Glycerol. |
| 14 | $C_{10}H_{13}$—O—$CH_2$—CHOH—$CH_2$—O—allyl | Glyceryl-monoallylether. |
| 15 | $C_{10}H_{13}$—O—$CH_2$—$(CH_2)_4$—$CH_2OH$ | Hexamethylene glycol. |
| 16 | $C_{10}H_{13}$—O—$CH_2$—$(CH_2)_8$—$CH_2OH$ | Decamethylene glycol. |

The condensation of formaldehyde with any of these alcohols containing a dihydronordicyclopentadienyl group takes place readily at 50°–150° C. or somewhat higher by heating a mixture of formaldehyde with the alcohol in the presence of an acidic condensing agent. The reactants are preferably mixed in a ratio of about one mol of formaldehyde to two mols of the alcohol, but excess of either reactant is permissible.

Typical of the acidic condensing agents which may be used are phosphoric acid, sulfuric acid, hydrochloric acid, dihydroxyfluoboric acid, acidic siliceous clays, benzene sulfonic acid, zinc chloride, phosphotungstic acid, and the like. The quantity of acidic condensing agents used is small, an amount from 0.5% to 5% of the weight of the reactants being usually sufficient for the purpose.

Water is evolved and is advantageously removed by utilizing an organic solvent, such as benzene or toluene, to help distill off the water in an azeotropic mixture as fast as it is formed. In place of benzene there may be used other inert solvents, including hydrocarbons, such as toluene and xylene, ethers such as propyl or butyl ethers, chlorinated solvents such as dichloro- or tetrachloro-ethane, and the like.

After the reaction is complete, the crude product is neutralized with alkali and the product isolated by vacuum distillation, by steam-vacuum distillation, or simply by stripping off the solvent and low boiling impurities with subsequent clarification or bleaching of the residual high-boiling product.

The formals obtained are high-boiling oils or low-melting solids yielding viscous, oily liquids of particular value for the preparation of autoxidizable coatings.

The following examples illustrate this invention, it being understood that the paraformaldehyde can be replaced with trioxymethylene or aqueous formaldehyde.

*Example 1*

A mixture of 300 g. of hydroxydihydronordicyclopentadiene, 30 g. of paraformaldehyde, 200 g. of benzene, and 10 g. of syrupy 85% phosphoric acid was stirred and boiled under a reflux condenser attached to a water trap for 85 minutes, during which time 20 g. of water collected in the trap. The product was washed with excess dilute sodium hydroxide solution followed by a water wash, dried, and distilled. Benzene was first removed and then under reduced pressure unchanged hydroxydihydronordicyclopentadiene was taken off in an amount of 52 g. The desired formal distilled over between 183° and 203° C. at 1.5–3 mm. as a colorless oil. The yield was 215 g. Upon redistillation it boiled at 180° C. at 2 mm.

The hydroxydihydronordicyclopentadienyl formal thus obtained polymerizes to a colorless, very viscous oil when heated at 100° C. with 5% by weight of benzoyl peroxide. This polymer as well as the unpolymerized formal dries by autoxidation upon exposure to the air, alone or with siccatives, to a colorless varnish-like film. It can also be blended with drying oils such as linseed oil to yield high quality varnishes and baking enamels.

*Example 2*

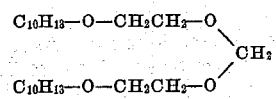

A mixture consisting of 291 g. of beta-hydroxyethoxydihydronordicyclopentadiene,

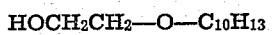

together with 200 g. of benzene, 30 g. of paraformaldehyde, and 10 g. of phosphoric acid (85%) was stirred and boiled under a reflux condenser attached to a water trap for three hours at 85°–93° C. until 20 g. of water had collected in the trap. The product was washed with dilute sodium hydroxide solution to remove the catalyst, and the washed product evaporated to dryness to recover the solvent. The residual oil was distilled in vacuo.

The di-(dihydronordicyclopentadienyloxyethyl) formal distilled over at 235°–245° C./1.5 mm. as an almost colorless oil. The yield was 212 g. About 57 g. of unchanged ether alcohol was recovered.

*Example 3*

A mixture consisting of 300 g. of hydroxydihydronordicyclopentadiene, 35 g. of paraformaldehyde, 200 g. of benzene, and 30 g. of acid "Tonsil" clay (trade-mark for a brand of hydrated magnesium aluminum silicate) was rapidly stirred and boiled under a reflux condenser attached to a water trap. After about two hours heating at 82°–95° C., 21 g. of water had collected in the trap. The product was filtered hot by suction and the benzene distilled off from the clear filtrate. The residual oil upon distillation in vacuo yielded 253 g. of di-(dihydronordicyclopentadienyl) formal boiling between 180° and 200° C. at 2 mm., identical with that of Example 1.

Example 4

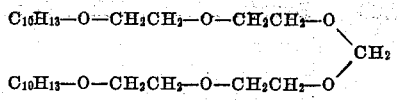

A mixture consisting of 113 g. of beta-hydroxyethoxyethoxy - dihydronordicyclopentadiene, 15 g. of paraformaldehyde, 100 g. of benzene, and 10 g. of acid "Tonsil" clay was stirred and boiled for 80 minutes under a reflux condenser attached to a water trap, until seven g. of water had come over. The product was filtered and distilled. The di(dihydronordicyclopentadienyloxyethoxyethyl) formal distilled as an almost colorless oil at 285° C./2 mm. The yield was 85 g.

Example 5

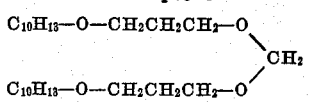

A mixture consisting of 208 g. of gamma-hydroxypropyloxydihydronordicyclopentadiene,

24 g. of paraformaldehyde, 150 g. of benzene and 20 g. of acid "Tonsil" clay was boiled under a reflux condenser until 12 cc. of water had collected in a trap attached thereto. This required two hours. The reaction mixture was filtered to remove the clay and the filtrate evaporated to dryness. The residual oil was distilled in vacuo at 2.5 mm. pressure. The fraction boiling at 260°–270° C./2.5 mm. was the desired formal. The yield was 165 g. It is a colorless oil.

Example 6

A mixture of 104 g. of glyceryl-alpha-methyl-gamma - (dihydronordicyclopentadienyl) ether, 15 g. of trioxymethylene, 100 g. of benzene, and 10 g. of acid "Tonsil" clay was boiled under a reflux condenser attached to a trap until no more water distilled over. This required about two hours. The clay was filtered off and the filtrate distilled first to remove the solvent and then under reduced pressure to purify the desired product.

The formal having the formula

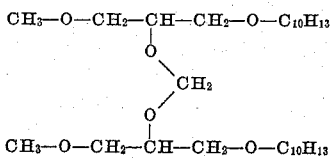

distilled over at 267°–274° C./2.5 mm. as a colorless oil.

In a similar manner the following formals are obtained as thick oils from the corresponding alcohols in the list given above.

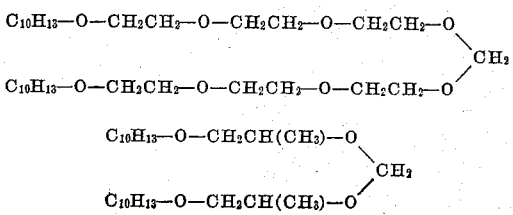

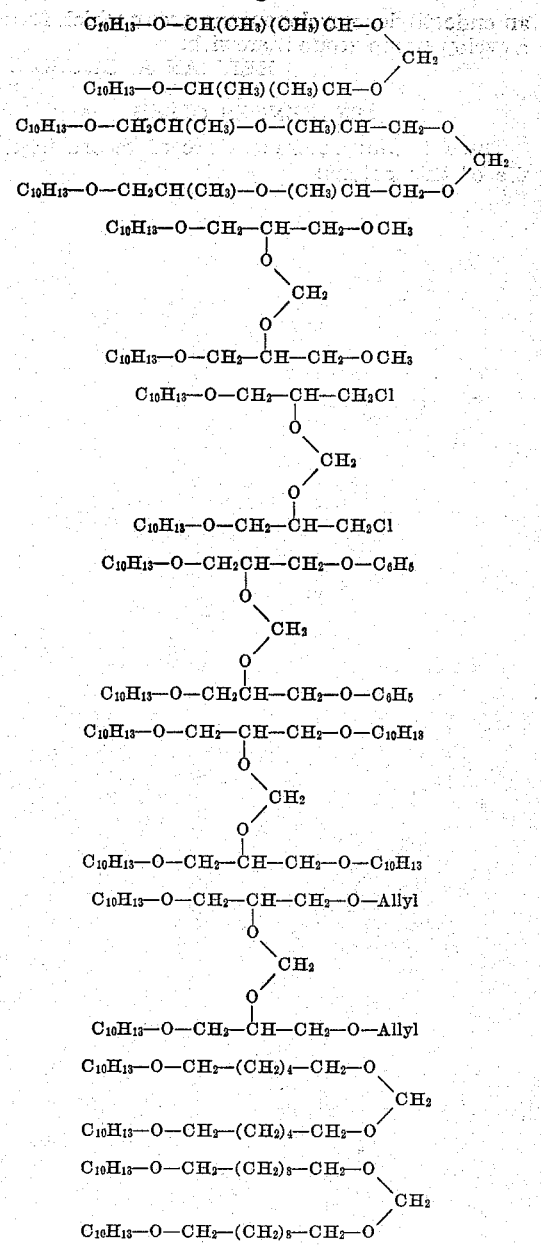

The above compounds, when blown with air at 100° C., go over to extremely viscous oils and resins which absorb oxygen from the air. They have the unique property of drying in air by absorption of oxygen, behaving in this respect like the natural drying oils, such as linseed oil or tung oil. They also polymerize to viscous oils useful as varnishes either alone or when blended or copolymerized with drying oils, alkyd resins, or other resins. They may be mixed with vinyl and acrylic compounds which are then polymerized. They may be used not only for paints, varnishes, and lacquers but also as bonding materials for cork and fibres, as for the preparation of linoleum, molding compositions, laminated fabrics, and the like.

I claim:

As a new compound, the formal of hydroxydihydronordicyclopentadiene, an alcohol obtained by the acid-catalyzed, addition-rearrangement reaction of water and dicyclopentadiene and further characterized by attachment of its hydroxyl group to a secondary carbon atom flanked by a methylene group and a tertiary carbon atom in an endoethylene cyclopentano group which forms a cyclopenteno group therewith.

HERMAN A. BRUSON.

REFERENCES CITED

The following references are of record in the file of this patent:

UNITED STATES PATENTS

| Number | Name | Date |
|---|---|---|
| 2,036,304 | Seymour | Apr. 7, 1936 |
| 2,183,317 | Auden | Dec. 12, 1939 |
| 2,394,582 | Bruson | Feb. 12, 1946 |
| 2,385,788 | Bruson | Oct. 2, 1945 |